United States Patent
Sawey et al.

(10) Patent No.: US 6,515,962 B1
(45) Date of Patent: Feb. 4, 2003

(54) HIT-LESS SWITCHING POINTER ALIGNER APPARATUS AND METHOD

(75) Inventors: David C. Sawey, Richardson, TX (US); Edmund K. Cher, Plano, TX (US)

(73) Assignee: Alcatel, Plano, TX (US)

( * ) Notice: Subject to any disclaimer, the term of this patent is extended or adjusted under 35 U.S.C. 154(b) by 0 days.

(21) Appl. No.: 09/354,865

(22) Filed: Jul. 16, 1999

(51) Int. Cl.[7] .............................. H04S 1/16; H04S 3/14
(52) U.S. Cl. ...................... 370/228; 370/227; 370/225
(58) Field of Search ............................... 370/228, 227, 370/225, 248, 220, 418, 464, 242, 428, 429

(56) References Cited

U.S. PATENT DOCUMENTS

| | | | |
|---|---|---|---|
| 5,051,979 A | 9/1991 | Chaudhuri et al. | 370/506 |
| 5,271,001 A | 12/1993 | Hadano | 370/506 |
| 5,285,441 A | 2/1994 | Bansal et al. | 370/506 |
| 5,315,581 A | 5/1994 | Nakano et al. | 370/506 |
| 5,631,896 A * | 5/1997 | Kawase et al. | 370/228 |
| 5,745,476 A | 4/1998 | Chaudhuri | 370/222 |
| 5,974,027 A * | 10/1999 | Chapman | 370/228 |
| 5,987,027 A | 11/1999 | Park et al. | 370/360 |
| 6,032,452 A | 2/2000 | Shiragaki | 370/227 |
| 6,061,329 A * | 5/2000 | Abe | 340/825.01 |
| 6,075,631 A * | 6/2000 | Bala et al. | 359/118 |
| 6,078,596 A * | 6/2000 | Wellbrock | 370/244 |
| 6,195,330 B1 * | 2/2001 | Sawey et al. | 370/217 |
| 6,246,668 B1 * | 6/2001 | Kusyk | 370/228 |

FOREIGN PATENT DOCUMENTS

| | | | |
|---|---|---|---|
| WO | WO 99/14655 | 3/1999 | G06F/3/00 |
| WO | WO 99/16010 | 4/1999 | G06K/9/00 |

OTHER PUBLICATIONS

Di Mauro, E. C., "Check! A Generic and Specific Industrial Inspection Tool", IEE Proceedings: Vision, Image and Signal Processing, (Aug. 1996), vol. 143, No. 4.

* cited by examiner

Primary Examiner—Wellington Chin
Assistant Examiner—William Schultz
(74) Attorney, Agent, or Firm—Gray Cary Ware & Freidenrich, LLP

(57) ABSTRACT

A system and method are disclosed for processing digital signals in a telecommunications system that allow for hit-less switching between a first digital signal in which a first payload, a first pointer value, and a first frame are transported on a first channel, and a second digital signal in which a second payload identical to the first payload, a second pointer value, and a second frame are transported on a second channel. The present invention includes first and second pointer followers, first and second comparators, a delay buffer with control circuit, first, second, third and fourth multiplexers, and a pointer generator. The delay buffer control circuit further comprises a write counter, a read counter, a phase detector, and a leak-out mechanism for reinitializing the delay buffer. The present invention aligns the payloads of the first and second digital signals to allow for hit-less selection between them.

24 Claims, 3 Drawing Sheets

HIT-LESS SWITCHING POINTER ALIGNER APPARATUS AND METHOD

TECHNICAL FIELD OF THE INVENTION

The present invention relates generally to switching systems and, more particularly, to an improved system and method for error-less switching from a working channel to an alternate channel carried over a diverse route.

BACKGROUND OF THE INVENTION

Switching of digital signals from a service (working) channel to an alternate (protect) channel, and vice versa, in a telecommunications system can cause a "hit" to the traffic. In other words, the payload can be corrupted during this switch from the working channel to the protect channel. This corruption occurs because the protect channel and the working channel have different signal payload pointer values, and a processor circuit must recognize the different pointer values and align its counter. During this time the traffic can be corrupted.

In some signal formats (for example, the SONET format), a payload and the starting location of a payload (i.e., a predetermined unit of data called a pointer value) can float within each frame and the bit streams arriving at the receiver from the working and protect channels may not be identical. Furthermore, the overhead bytes of the signal carried on the working channel may be different than the overhead bytes of the signal carried on the protect channel, even if the starting location of the payload and corresponding frames is the same. Signals carried on a SONET network may, for example, need to be re-routed from the working channel to an alternate protect channel which may pass through an intermediate central location. To keep the payload synchronous with the SONET network, the payload may be shifted within the frame. The signals that arrive at the receiving end on the working and protect channels could then possibly be different.

U.S. Pat. No. 5,051,979 claims to teach a method for achieving hit-less switching between SONET signals. In this method, each STS-1 signal is frame-aligned by an individual delay buffer and sent to an individual pointer processor for payload alignment. Inside the pointer processor, each signal's payload data is extracted and inserted into a new frame, along with a new pointer value. At the output of each pointer processor, the new pointer values are sent to a pointer justification and controller circuit. One of the pointer processors is designated the master and the other pointer processor is designated the slave. The pointer justification and controller circuit monitors the pointer value generated by the master pointer processor and, based on the master pointer value, sends justification control information to the slave pointer processor. Thus, at the output of the two pointer processors, the pointer values match and the payloads are now aligned. Subsequently, each signal is sent to a 2:1 multiplexer which selects between the two STS-1 channels. Because the signals are both frame- and payload-aligned, a simple 2:1 selection can cause a switch from the working channel to the protect channel and back.

While this method appears to accomplish hit-less switching in switching systems employing a signal format such as the SONET format, the solution is complex and costly because it requires two complete pointer processor functions to accomplish payload alignment. This approach requires the generation of two distinct SONET frames before performing the hitless selection. The circuitry required to implement this solution is complex, requiring a separate pointer processor to regenerate a new SONET frame for each of the two channels before the switch can occur.

Additionally, it is possible in a SONET network for a signal's pointer value to change abruptly in response to changes in the network (for example, when a faulty node returns to an operational state). In a hit-less switching application, it is important that abrupt changes in the pointer value of one channel (e.g., the protect channel) do not affect the other channel (e.g., the working channel).

SUMMARY OF THE INVENTION

Therefore, a need exists for an improved error-less (hit-less) switching technique that provides the capability to perform a hit-less switch between two signals in a telecommunications network using only a single pointer processor function to align the signal payloads and which is therefore simpler and less costly than present hit-less switching techniques.

A further need exists for an improved hit-less switching technique that does not require the generation of a distinct SONET frame for each of the two signals prior to the signal selection.

A still further need exists for an improved hitless switching technique with the ability to prevent abrupt changes in the pointer value of one channel (e.g., the protect channel) from affecting the other channel (e.g., the working channel).

The present invention provides an improved hit-less switching system and method that substantially eliminates or reduces disadvantages and problems associated with previously developed hit-less switching systems and methods used for error-less switching of signals from a working channel to an alternate protect channel.

In particular, the present invention provides a system and method for processing digital signals in a telecommunications system that allows for hit-less switching between a first digital signal in which a first payload, a first pointer value, and a first frame are transported on a first channel, and a second digital signal in which a second payload identical to the first payload, a second pointer value, and a second frame are transported on a second channel.

In one embodiment, the hit-less pointer aligner of the present invention includes first and second pointer followers, first and second comparators, first, second and third multiplexers, a delay buffer with control circuit, and a pointer generator. The system selects between working and protect STS-1 (SONET Synchronous Transport Level 1) signals, or other similar signals, without affecting their payload. At the circuit input, each STS-1 signal is processed by only one of either the first pointer follower or the second pointer follower, which receives the corresponding signal, extracts the corresponding pointer value, removes the corresponding frame and forwards the extracted pointer value to the first comparator and the corresponding payload to the second multiplexer. The first comparator receives the working pointer value and the protect pointer value and compares them to determine between the working signal and the protect signal which of the two signal's payload is ahead and which is behind (the signal with the ahead payload is the ahead signal, and the other signal is the behind signal). The comparator generates a select bit which it forwards to the first, second and third multiplexers. The select bit is used by each of the first, second and third multiplexers to determine which of the two inputs each is receiving each will then forward (select).

The working and protect signals are also both forwarded unprocessed to a first multiplexer, bypassing the first and second pointer followers. The first multiplexer also receives as an input the select bit from the first comparator. Based on the select bit being low or high the first multiplexer determines which signal (working or protect) to select (i.e., let pass). The signal forwarded by the first multiplexer is the signal that is determined by the first comparator to be the behind signal and it is sent through the system unaffected.

The second 2:1 multiplexer receives as inputs from the working and protect pointer followers the working and protect signal payloads. Based on the value of the select bit forwarded by the first comparator, the second multiplexer selects the payload of the signal that was determined by the comparator to be ahead and forwards that ahead payload to the delay buffer.

The first and second pointer followers also forward to the third multiplexer the working and protect signal pointer values. Additionally, the third multiplexer receives as an input the select bit from the first comparator and uses it to determine which of the working and protect pointer values is the pointer value corresponding to the behind signal. The third multiplexer selects the pointer value associated with the behind signal and forwards it as a bypass pointer value to the second comparator.

After passing through the third multiplexer the ahead signal's payload is written to the delay buffer, where an appropriate delay is built into the signal to match the ahead signal to the behind (bypass) signal. The delay buffer forwards the ahead signal payload to the pointer generator.

The pointer generator receives the ahead signal payload and generates a third frame and a PG pointer value for the ahead signal payload to create a third digital signal with a third payload that is identical to the first and second payloads and wherein the third frame may be aligned with the first and second frames. The circuit is fully symmetric so that a switch from protect traffic back to working traffic uses the same mechanism.

The pointer generator forwards the PG pointer value to the second comparator. The second comparator compares the PG pointer value with the bypass pointer value to determine the amount of delay between the working payload and the protect payload. The second comparator generates increment/decrement request signals that are forwarded to the delay buffer. The delay buffer varies the pointer value position of the payload in the third newly created digital signal in response to the increment/decrement request signals. The delay buffer control circuit further comprises a write counter in communication with the delay buffer to write the ahead signal payload bytes in sequence to the delay buffer, and a read counter in communication with the delay buffer to read the ahead signal payload bytes from the delay buffer.

The present invention provides an important technical advantage in that it implements hit-less switching between two channels in a telecommunications network without the added expense of the two full pointer processor functions of the aforementioned U.S. Pat. No. 5,051,979.

Another technical advantage of the present invention is that it provides an improved hit-less switching technique that can be used to perform a hit-less switch between two signals in a telecommunications network by aligning the signal payloads. Without the need for separate pointer processor functions to regenerate a new SONET frame for each of the two channels in the network following payload alignment, the system is simpler and less costly than present hit-less switching techniques.

Another technical advantage of the present invention is that it provides an improved hit-less switching technique with the ability to prevent abrupt changes in the pointer value of one channel (e.g., the protect channel) from affecting the other channel (e.g., the working channel).

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES like numerals being used to refer to like and corresponding parts of the various drawings.

The present invention provides the capability for hit-less switching between two digital signals with identical payloads. In a typical application, such as that shown in FIG. 2, a transmitting device 8 and a receiving device 11 can be separated over a long distance. Receiving device 11 and transmitting device 8 can be connected by working channel 7 and protect channel 9. The interface between transmitting device 8 and receiving device 11 can be duplex and hence will work the same in either direction, but the following description will restrict itself to discussion of only one direction.

Figure 2:
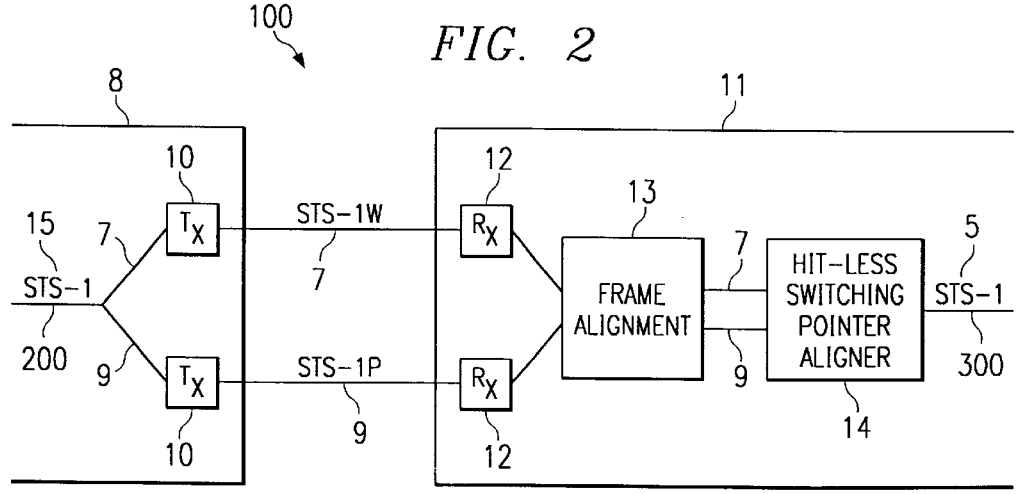
FIG. 2 shows a block diagram representation of an example network incorporating an embodiment of the hit-less pointer aligner of the present invention.

FIG. 2 shows a block diagram of an embodiment of hit-less switching pointer aligner 14 of the present invention incorporated into a telecommunications system 100. Telecommunications system 100 can be, for example, an optical telecommunications system utilizing the SONET signal format. FIG. 2 includes STS-1 signal 15 originating from transmitting device 8, where it is split and forwarded to transmitters/pointer processors 10 along working channel 7 and protect channel 9 as working signal STS-1W and protect signal STS-1P. Transmitters 10, which can be identical transmitters, forward working signal STS-1W and protect signal STS-1P to receivers 12 of receiving device 11 over working channel 7 and protect channel 9, respectively.

Figure 1:
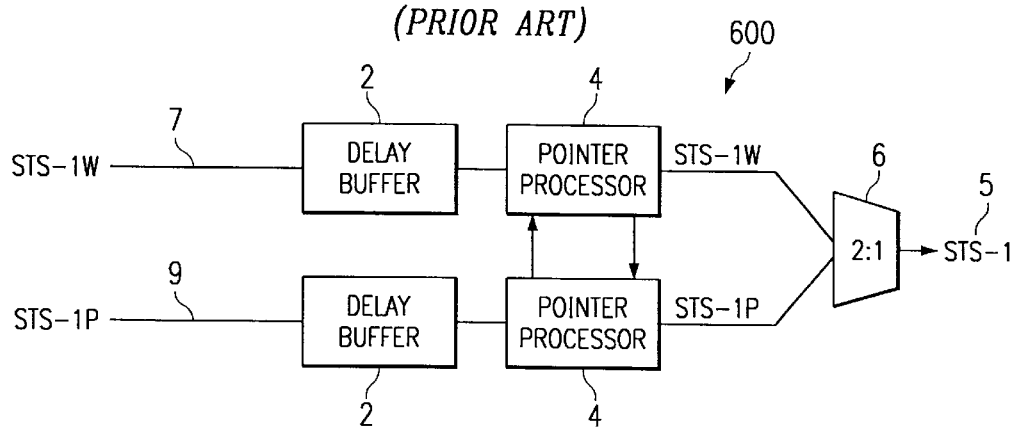
FIG. 1 shows a prior art hit-less switching system.

Receivers 12 of receiving device 11 receive working and protect signals STS-1W and STS-1P. Receivers 12 can be identical receiving units. Receivers 12 forward working and protect signals STS-1W and STS-1P to frame aligning device 13. Frame aligning device 13 can be a system similar to the prior art frame aligning device comprising dual delay buffers as shown in FIG. 1. FIG. 1 will be more fully explained below.

Frame aligning device 13 aligns the signal frames of working signal STS-1W and protect signal STS-1P and forwards the frame-aligned working and protect signals STS-1W and STS-1P to hit-less switching pointer aligner 14. Hit-less switching pointer aligner 14 aligns the respective payloads of working and protect signals STS-1W and STS-1P to allow a hit-less switching operation between them using a selection device, such as a 2:1 multiplexer (shown in more detail in FIG. 3). The 2:1 multiplexer selects only one of the working signal STS-1W or protect signal STS-1P, which are now both frame- and payload-aligned and can forward selected STS-1' signal 5, which has a payload identical to the payload of original STS-1 signal 15, to the rest of the system along output channel 300.

Working signal STS-1W and protect signal STS-1P arrive at hit-less pointer aligner 14 of FIG. 2 with identical payloads, but with different pointer values. The pointer value difference exists because each signal has taken a different path through telecommunications system 100. It is now desirable to select between working signal STS-1W and protect signal STS-1P without affecting their payload. Such a selection between working signal STS-1W and protect signal STS-1P, which does not corrupt the forwarded payload, is referred to as a hit-less switch.

In a typical digital signal processing network, the signal carrying the data payload is carried on redundant paths, as described above in connection with FIG. 2, to provide the capability of uninterrupted signal transmission while one of the two channels is down for maintenance. The capability to hit-lessly switch between a working channel and a protect channel gives the network user the option to transfer the traffic being carried on the working channel to an alternate protect channel without loss of data. Maintenance of one or the other of the working or protect channels will therefore not affect the user's ability to carry his traffic without interruption. Furthermore, a hit-less switching system allows for switching between the working and protect channels in a manner transparent to the user who is receiving the information (payload) being carried on the network.

Figure 3:
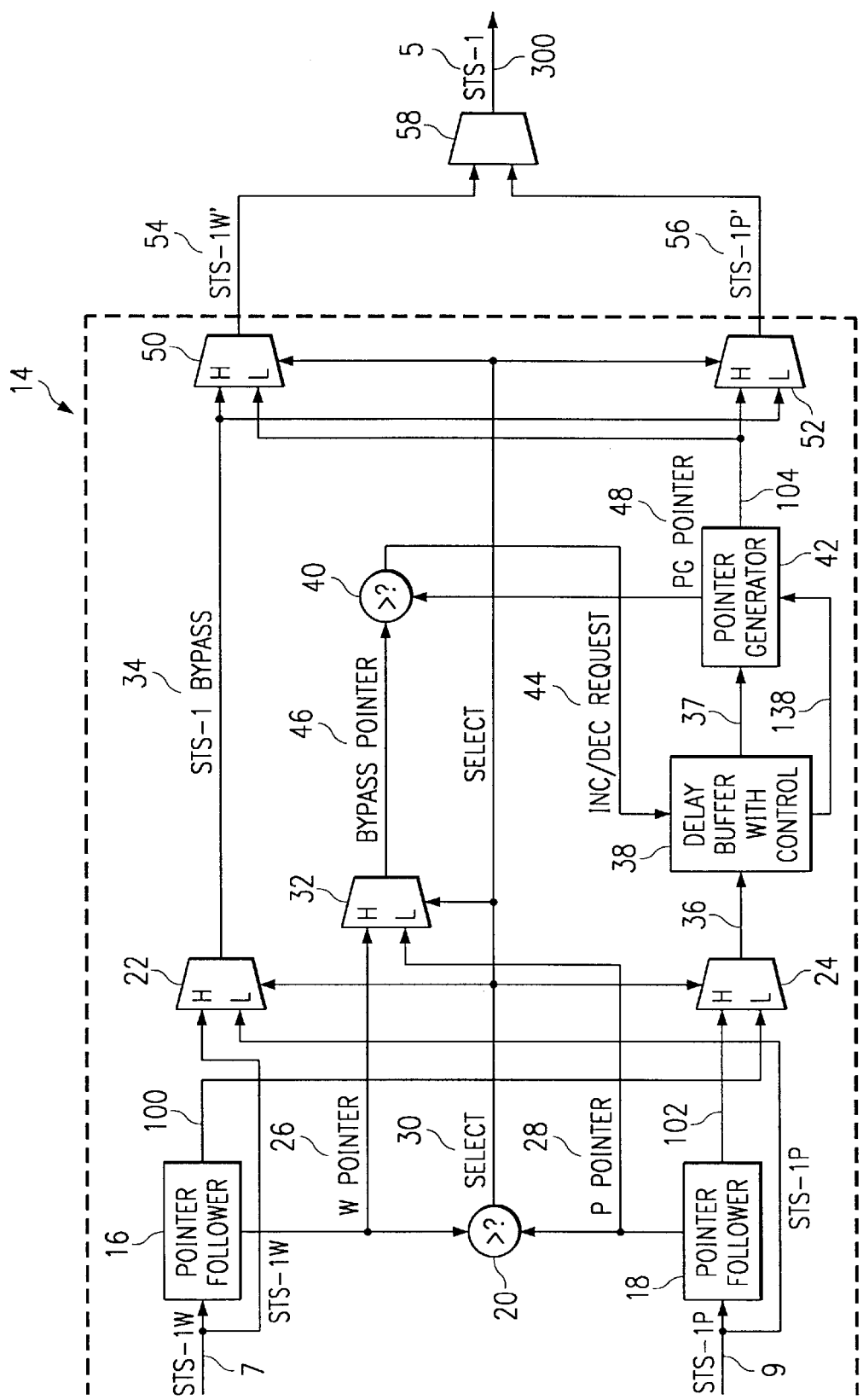
FIG. 3 is a close up view of a simplified block diagram showing an exemplary implementation of the hit-less pointer aligner of FIG. 2.

FIG. 3 shows a close-up block diagram of hit-less switching pointer aligner 14. At the circuit input, working signal STS-1W is received and processed by working pointer follower 16, and protect signal STS-1P is received and processed by protect pointer follower 18. In this embodiment of the present invention, signals STS-1W and STS-1P are frame-aligned when received by pointer followers 16 and 18. Working signal STS-1W and protect signal STS-1P are also received unprocessed by 2:1 multiplexer 22.

Working pointer follower 16 locates the STS-1 frame in working signal STS-1W and extracts working pointer value 26 and working payload 100. Protect pointer follower 18 locates the STS-1 frame in protect signal STS-1P and extracts protect pointer value 28 and protect payload 102. Working pointer follower 16 and protect pointer follower 18 discard the SONET frame (SONET overhead) after extracting working pointer value 26 and working payload 100 and protect pointer value 28 and protect payload 102. Working payload 100 and protect payload 102 are the actual user traffic. Working pointer follower 16 and protect pointer follower 18 forward working payload 100 and protect payload 102, respectively, to 2:1 multiplexer 24. Working pointer follower 16 and protect pointer follower 18 forward working pointer value 26 and protect pointer value 28 to comparator 20 and also to 2:1 multiplexer 32.

Working pointer value 26 and protect pointer value 28 need to be aligned to ensure that the user traffic is not affected during a protection switch. Working pointer value 26 and protect pointer value 28 are received by comparator 20, which compares working pointer value 26 and protect pointer value 28 to determine, as between working signal STS-1W and protect signal STS-1P, which signal's payload is ahead (the signal having the ahead payload is the ahead signal, and the other is the behind signal). Because in this embodiment of the present invention working signal STS-1W and protect signal STS-1P are frame-aligned when they arrive at working and protect pointer followers 16 and 18, working pointer value 26 and protect pointer value 28 can be used to determine which of the two payloads (and hence which signal) is ahead and which one is behind.

Comparator 20 determines which of working signal STS-1W or protect signal STS-1P is ahead and generates select bit 30, which it can then forward to 2:1 multiplexers 22, 24, 32, 50 and 52. Select bit 30 is a one-bit signal that can be low (a digital "0") if working signal STS-1W is ahead and high (a digital "1") if protect signal STS-1P is ahead. Select bit 30 can be received by 2:1 multiplexers 22, 24, 32, 50 and 52 and used by each to select which of the two signals coming into each multiplexer will be forwarded. For example, if select signal 30 is low, the signal coming into the low side of each 2:1 multiplexer will be forwarded. Conversely, if select signal 30 is high, the signal coming into the high side of each 2:1 multiplexer will be forwarded.

2:1 multiplexer 22 receives working signal STS-1W and protect signal STS-1P in an un-processed state. 2:1 multiplexer 22 also receives select bit 30 from comparator 20. Based on whether select bit 30 is high or low, 2:1 multiplexer 22 can select between working signal STS-1W and protect signal STS-1P. 2:1 multiplexer 22 selects whichever of the two signals received at the input side of 2:1 multiplexer 22 corresponds to the low or high state of select bit 30.

For example, in this embodiment of the present invention, select bit 30 can be low if working signal STS-1W is ahead and can be high if protect signal STS-1P is ahead. In such case, if working signal STS-1W is ahead, multiplexers 22, 24, 32, 50 and 52 will each receive a low value for select bit 30. Each of these multiplexers can then select, based on select bit 30, whichever of working signal STS-1W or protect signal STS-1P is being received on their corresponding low side. In the case of working signal STS-1W being ahead, 2:1 multiplexer 22, for example, can, upon receiving a low select bit 30, select and forward protect signal STS-1P.

It makes no difference to the present invention which of working signal STS-1W or protect signal STS-1P is the ahead signal. Hit-less switching pointer aligner 14 of the present invention will work the same in either case. For purposes of clarity, this description will restrict itself to the case where working signal STS-1W is the ahead signal.

2:1 multiplexer 24 receives working payload 100 and protect payload 102 from working pointer follower 16 and protect pointer follower 18, respectively. 2:1 multiplexer 24 also receives select bit 30 from comparator 20. The operation of 2:1 multiplexer 24 is essentially the same as that of 2:1 multiplexer 22. In the case where working signal STS-1W is the ahead signal, select bit 30 can be low and 2:1 multiplexer 24 can select working payload 100 and forward it to delay buffer with control circuit 38 as ahead payload 36. Ahead payload 36 corresponds to the ahead signal payload. The behind signal, protect signal STS-1P in this example, is forwarded without processing by 2:1 multiplexer 22 as described above and sent through the circuit without modification as STS-1 bypass signal 34. 2:1 multiplexer 32 receives working pointer value 26 and protect pointer value 28 and also receives select bit 30. The operation of 2:1 multiplexer 32 is essentially the same as that of 2:1 multiplexers 22 and 24. 2:1 multiplexer 32 can select, based on select bit 30, either of working pointer value 26 or protect pointer value 28 which corresponds to the signal determined by comparator 20 to be the behind signal. 2:1 multiplexer 32 can then forward the behind signal's pointer value, protect pointer value 28 in this example, as bypass pointer value 46.

2:1 multiplexer 24 forwards ahead payload 36 to delay buffer with control circuit 38. Delay buffer with control circuit 38 receives ahead payload 36 and, in cooperation with pointer generator 42 and comparator 40, delays ahead payload 36 such that it is aligned with the payload of bypass signal 34. This is the actual payload alignment of working signals STS-1W and protect signal STS-1P. Delay buffer with control circuit 38 can be two-port RAM with independent read and write ports.

Figure 4:
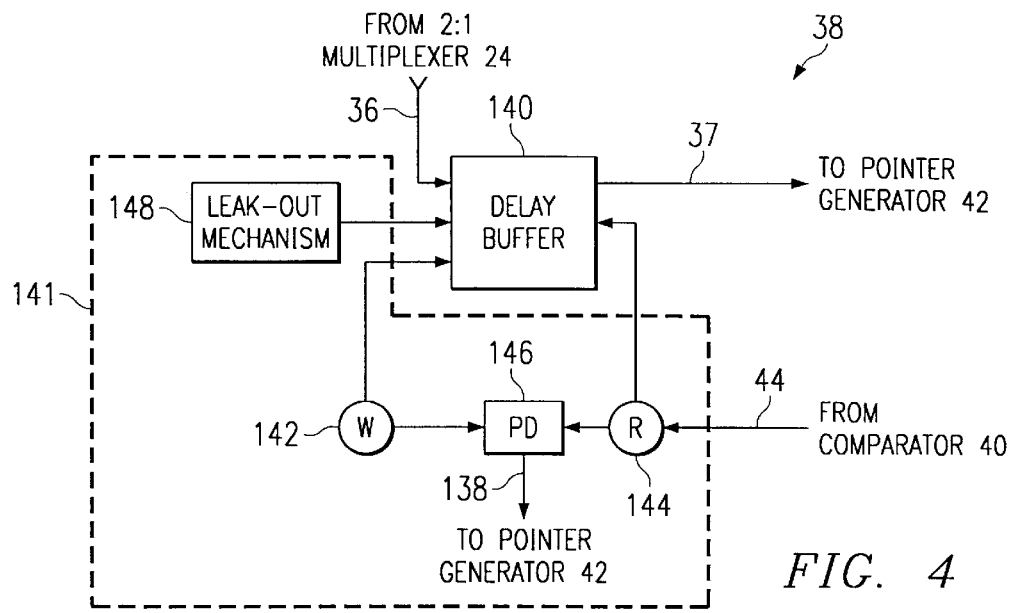
FIG. 4 shows a detailed block diagram view of the delay buffer with control circuit of FIG. 3.

FIG. 4 shows a representative close-up block diagram detail of delay buffer with control circuit 38. Write counter 142 of control circuit 141 (control circuit 141 is shown within the dashed lines) is communicatively connected to the input side of delay buffer 140 and generates write addresses to write ahead payload 36 into delay buffer 140. Read counter 144 is communicatively connected to the output side of delay buffer 140 and generates read addresses for delay buffer 140 to read ahead payload 37 from delay buffer 140. Read counter 144 receives increment/decrement signal 44 from comparator 40 to insert the appropriate delay into ahead payload 36. Delay buffer 140 can be two-port Ram with independent read and write ports (at least one read port and one write port) controlled by read counter 144 and write counter 142.

Phase detector 146 of FIG. 4 is communicatively connected to write counter 142 and read counter 144, taking inputs from both. Phase detector 146 measures the offset between read counter 144 and write counter 142 and ensures that delay buffer 140 does not spill (i.e., that it does not run out of data or does not overflow with too much data). Phase detector 146 prevents delay buffer 140 from spilling by using the measured offset between read counter 144 and write counter 142 to generate a spill prevent signal 138. Phase detector 146 forwards spill prevent signal 138 to pointer generator 42. Pointer generator 42 uses spill prevent signal 138 to generate PG pointer value 48 such that delay buffer 140 does not spill while inserting the delay into ahead payload 36. The input side of delay buffer 140 is also communicatively connected to leak-out mechanism 148, which returns delay buffer 140 to its nominal position following an internal switch where the ahead signal becomes the behind signal and vice versa. Such a switch is more fully described below.

Returning now to FIG. 3, delay buffer with control circuit 38 inserts a variable amount of delay into ahead payload signal 36. The amount of delay inserted by delay buffer with control circuit 38 is the amount of delay required to align working pointer value 26 and protect pointer value 28 (i.e., to align the payloads of working signal STS-1W and protect signal STS-1P) on the output side of the circuit. The amount of delay can be determined by bypass pointer value 46, which is forwarded by 2:1 multiplexer 32 to comparator 40. Bypass pointer value 46 is the same as the pointer value of bypass signal 34 (the behind signal), which in this example corresponds to protect signal STS-1P.

To align the payloads of working signal STS-1W and protect signal STS-1P, hit-less switching pointer aligner 14 aligns the ahead signal pointer value with bypass pointer value 46. Pointer generator 42 receives ahead payload 37 from delay buffer with control circuit 38 and generates a third SONET overhead (frame) and PG pointer value 48. Pointer generator 42 can combine the third SONET overhead and PG pointer value 48 with ahead payload 37 to create a third digital signal 104 with a third payload identical to working payload 100 and protect payload 102. In this embodiment of the present invention, the third SONET overhead is aligned with the SONET overheads (frames) of working and protect signals STS-1W and STS-1P. Pointer generator 42 generates this SONET frame such that it is placed around ahead payload 37. PG pointer value 48 points to the location of ahead payload 37 within output signal 104. Pointer generator 42 wraps the STS frame around ahead payload 37 and inserts PG pointer value 48 into the outgoing data stream according to the location of ahead payload 37 relative to the STS frame. Pointer generator 42 forwards PG pointer value 48 to comparator 40 and forwards output signal 104 to 2:1 multiplexers 50 and 52.

Comparator 40 receives and compares bypass pointer value 46 and PG pointer value 48 to determine the delay between them. Comparator 40 generates increment/decrement request signal 44 and forwards it to delay buffer with control circuit 38. Increment/decrement request signal 44 can be used to adjust the level of delay buffer with control circuit 38 to compensate for the delay between bypass pointer value 46 and PG pointer value 48 and bring them into alignment. Delay buffer with control circuit 38 can be a variable delay buffer.

Initially, bypass pointer value 46 and PG pointer value 48 may not be equal. However, by action of comparator 40, delay buffer with control circuit 38, and pointer generator 42 operating a feedback loop, bypass pointer value 46 and PG pointer value 48 eventually can be brought into alignment. Working and protect payloads 100 and 102 will therefore likewise be aligned. Bypass pointer value 46 comes into comparator 40 with one value, and PG pointer value 48 is received by comparator 40 with a possibly different value (at least, initially). The value of PG pointer value 48 that pointer generator 42 initially generates for output signal 104 may not match the value of bypass pointer value 46. The payloads of output signal 104 and bypass signal 34 may therefore not be aligned. In other words, working payload 100 and protect payload 102 of working signal STS-1W and protect signal STS-1P may initially not be aligned. Over some short (on the order of milliseconds) period of time while comparator 40, delay buffer with control circuit 38 and pointer generator 42 are bringing bypass pointer value 46 and PG pointer value 48 into alignment, the payloads of bypass signal 34 and output signal 104 may not be aligned.

Delay buffer with control circuit 38, pointer generator 42 and comparator 40 form a feedback loop that operates on bypass pointer value 46 and PG pointer value 48. This feedback loop operates by virtue of the SONET format pointers (i.e., bypass pointer value 46 and PG pointer value 48) having a mechanism by which the pointer values can change over time—increment/decrement —according to the SONET standard. The SONET standard provides for the pointer values changing by a maximum increment/decrement rate of one every four frames. The SONET format provides discretion as to which direction to move the pointer value, either up or down, at any given time, so long as payload integrity is maintained.

For example, if bypass pointer value 46 initially is ten, and PG pointer value 48 is initially five, PG pointer value 48 has to increase by five increments to equal bypass pointer value 46. Comparator 40 compares bypass pointer value 46 and PG pointer value 48 and determines there is a difference of five between them. Comparator 40 generates increment/decrement request signal 44 and forwards it to read counter 144 of delay buffer with control circuit 38 to insert the appropriate delay to align bypass pointer value 46 and PG pointer value 48. The value of the increment portion of increment/decrement request signal 44 would be high (a digital "1"), indicating an increment is required, and the decrement portion of increment/decrement request signal 44 would be low (a digital "0"), indicating no decrement is required.

Delay buffer with control circuit 38 receives increment/decrement request signal 44 from comparator 40 and delays ahead payload 36 to add one increment to it. Pointer generator 42 receives newly-delayed working payload 37 and generates a new PG pointer value 48, whose value is now six. PG pointer value 48 is again forwarded to comparator 40 and is compared by comparator 40 to bypass pointer value 46, at which point a new increment/decrement request signal 44 is generated in the same manner described above. Every four frames, therefore, according to the SONET format, the value of PG pointer value 48 increases by one. The cycle repeats itself until bypass pointer value 46 and PG pointer value 48 are equal (i.e., they are aligned). When both bypass pointer value 46 and PG pointer value 48 are aligned, comparator 40 generates an increment/decrement request signal 44 wherein both the increment and the decrement signal portions are low, indicating no change is necessary. This process would occur in essentially the same manner in the situation where bypass pointer value 46 is initially less than PG pointer value 48, except that the decrement portion of increment/decrement request signal 44 in that case would be high and the increment portion signal would be low.

It is also possible for bypass pointer value 46 to be incrementing/decrementing by one, according to the SONET format, over time (i.e., the behind signal payload location could be changing over time). The present invention, however, can detect that bypass pointer value 46 has itself incremented/decremented and can correspondingly adjust PG pointer value 48 via delay buffer with control circuit 38, pointer generator 42, and comparator 40. The two signals can therefore be maintained in alignment. Note, however, that bypass pointer value 46 is itself not adjusted. Instead, PG pointer value 48 is adjusted to align the two pointer values. Once ahead signal 104 and bypass signal 34 are payload aligned, a hit-less switch can be performed. Bypass signal 34 and output signal 104 are both frame-and payload-aligned and can be forwarded to 2:1 multiplexers 50 and 52. 2:1 multiplexers 50 and 52 also receive select bit 30.

Operation of 2:1 multiplexers 50 and 52 is essentially the same as that of multiplexers 22, 24 and 32. Both select one or the other of bypass signal 34 and output signal 140 based on the state of select bit 30. If, as in the present description, working signal STS-1W is the ahead signal, select bit 30 is low. In response to a low select bit 30, 2:1 multiplexer 50 selects its low channel input, corresponding in this case to output signal 104, which corresponds to working signal STS-1 (the ahead signal). 2:1 multiplexer 52 likewise selects the signal received at its low input, which in this case corresponds to bypass signal 34. 2:1 multiplexers 50 and 52 forward their respective selected signal as output working signal STS-1W' 54 and output protect signal STS-1P' 56, respectively.

2:1 multiplexers 50 and 52 perform a bookkeeping function to place working signal STS-1W and protect signal STS-1P back on their original respective working and protect channels 7 and 9 after they have been payload aligned. Since both working and protect signals STS-1W and STS-1P (now bypass signal 34 and output signal 104, respectively) are both frame- and payload-aligned at the inputs to 2:1 multiplexers 50 and 52, it is not necessary to return each signal to its respective original channel. If desired, 2:1 multiplexers 50 and 52 can be employed, as in this embodiment of the present invention, to return the original working signal STS-1W and protect signal STS-1P to their original working and protect channels 7 and 9. 2:1 multiplexers 50 and 52 essentially undo the selection done at the beginning of the circuit (i.e., they place working signal STS-1W back on working channel 7 and protect signal STS-1P back on protect channel 9 in the event they were swapped around during processing in hit-less switching pointer aligner 14). However, hit-less switching pointer aligner 14 of this invention can be configured without 2:1 multiplexers 50 and 52. Bypass signal 34 and output signal 104 can instead be forwarded directly to a 2:1 multiplexer such as 2:1 multiplexer 58, where the hit-less protection switch can occur.

2:1 multiplexers 50 and 52 can forward output working signal STS-1W' 54 and output protect signal STS-1P' 56, respectively, to 2:1 multiplexer 58. 2:1 multiplexer 58 performs the selection (switching) between output working signal STS-1W' and output protect signals STS-1P'. 2:1 multiplexer 58 performs the actual hit-less switch between the original working and protect signals once they have been frame- and payload-aligned. 2:1 multiplexer 58 forwards hit-lessly selected STS-1' signal 5 to the rest of the system.

During initialization of the circuit there are initially points of mismatch between working signal STS-1W and protect signal STS-1P. Therefore, over some short (on the order of microseconds to milliseconds) period of time, the two signals are not aligned. After this short interval of time, however, the feedback loop comprised of comparator 40, delay buffer with control circuit 38, pointer generator 42, and increment/decrement request signal 44 operate to align bypass pointer value 46 with PG pointer value 48 and therefore align working and protect payloads 100 and 102 of working and protect signals STS-1W and STS-1P. It is possible, however, that during circuit operation the delays in telecommunications network 100 can change on either of working channel 7 or protect channel 9. These changes could occur slowly and at any particular time, and could result in the signal that was originally the behind signal changing to become the ahead signal.

In such a case, hit-less switching pointer aligner 14 of the present invention could be processing working signal STS-1W as the ahead signal through elastic buffer 38 and pointer generator 42, and could then have to switch to instead send protect signal STS-1P through the delay portion of the circuit if working signal STS-1W becomes the behind signal. Hit-less switching pointer aligner 14 of the present invention is designed to also accomplish in a hit-less manner this type of crossing over from one signal initially being ahead to being behind.

The present invention accomplishes this hit-less exchange by ensuring that the internal switch from sending one signal to the delay portion of the circuit to sending the other signal to the delay portion of the circuit occurs during the SONET transport overhead portion of the signal and not at the payload pointer byte location of the signal. By performing the crossover at the right time (during the SONET transport overhead), working and protect payloads 100 and 102 will not be affected by any glitches that may occur as a result of the switch because the payload will not be at the location being pointed to at the time of the switch. Therefore, the cross-over from one signal being the ahead signal to the other signal being the ahead signal can be made transparent to the payload. Following such a cross-over, leak-out mechanism 148 of FIG. 4 returns delay buffer 140 to its nominal position, making it ready to begin delaying the new ahead signal.

It is similarly possible in a SONET network for the pointer value of a signal to change abruptly in response to changes in the network; for example, when a faulty node returns to an operational state. The following example illustrates this situation. Suppose the two lines below represent the incoming values for working pointer value 26 and protect pointer value 28 of working signal STS-1W and protect signal STS-1P on a frame-by-frame basis (each column represents an individual frame):

STS-1W 4 4 4 4 4 4 4 4 4 4 4 4
STS-1P 6 6 6 6 3 3 3 3 3 3 3 3

Referring again to FIG. 3 and considering the first four frames above, comparator 20 would have compared working pointer value 26 and protect pointer value 28 and determined that working signal STS-1W (having pointer value 4) is ahead of protect signal STS-1P (having pointer value 6) by two increments. In this case, hit-less switching pointer aligner 14 of the present invention would select working signal STS-1W for processing through delay buffer with control circuit 38 to insert a delay of two increments. Following delay buffer with control circuit 38 and pointer generator 42, working payload 100 would be reconstructed with a pointer value of 6, as previously discussed, thereby matching the pointer value of protect signal STS-1P.

At frame number five above, incoming protect pointer value 28 abruptly changes its pointer value from six to three. Under normal circumstances, comparator 20 would decide that protect signal STS-1P is now ahead of working signal STS-1W and would re-route protect signal STS-1P's protect payload 102 through delay buffer with control circuit 38. If this action were to be carried out immediately, working signal STS-1W would be bypassed through 2:1 multiplexer 22 as STS-1 bypass signal 34. To equipment downstream of hit-less switching pointer aligner 14, this action would appear as if working pointer value 28 had abruptly changed from six (the delayed output value) to four (the unprocessed input value) in the course of a single frame, a traffic-affecting action for SONET pointers. To resolve this problem, the re-routing of protect signal STS-1P to delay buffer with control circuit 38 can be delayed until working signal STS-1W has an opportunity to be leaked back to its nominal (input) pointer value via legal SONET pointer actions. Once working signal STS-1W has been leaked back to its nominal position, it can be safely re-routed to the bypass path and protect signal STS-1P can be safety re-routed through delay buffer with control circuit 38.

To illustrate this point further, a possible output scenario corresponding to the input pointer values described above is given below:

STS-1W 6 6 6 6 D 5 5 5 D 4 4 4
STS-1P 6 6 6 6 3 3 3 3 3 I 4 4

At frame number five, output protect pointer value 28 jumps from six to three at the output of hit-less switching pointer aligner 14 due to the action of the incoming protect pointer value 28 (the protect traffic is being bypassed because it is now seen as being ahead of the working traffic). At this point, hit-less switching pointer aligner 14 of the present invention determines that working signal STS-1W has become the behind signal and begins to decrement working pointer value 26 (indicated above by the letter D), as described above as part of the description of FIG. 3. By frame number ten, the outbound value of working pointer value 26 is the same as the inbound value of working pointer value 26, and the working traffic can be safely bypassed. At the same instant, hit-less switching pointer aligner 14 re-routes protect signal STS-1P into delay buffer with control circuit 38 with an initial delay of one increment. This allows hit-less switching pointer aligner 14 to increment the outbound protect pointer value 28 (indicated above by the letter I) so that it matches the outbound value of working pointer value 26.

Other input scenarios for working and protect pointer values 26 and 28 can be handled in a similar manner. The basic principle is to leak out the pointer value difference during abrupt pointer value movements so that the re-routing of working signal STS-1W and protect signal STS-1P is hit-less with respect to the signal that did not experience the pointer value jump. It is important to note that hit-less switching is not possible immediately following an instantaneous pointer movement because it takes time for hit-less switching pointer aligner 14 to stabilize after the movement. An abrupt change in the value of either working pointer value 26 or protect pointer value 28 that results in a change from one signal being the ahead signal to the other signal being the ahead signal can thus be made transparent to the payload. Following such a crossover, leak-out mechanism 148 of FIG. 4 can return delay buffer 140 to its nominal position, making it ready to begin delaying the new ahead signal.

Unlike the prior art, the present invention regenerates only a single SONET frame using a single pointer processor 42. For example, the prior art hit-less switching system 600 shown in FIG. 1 includes working and protect signals STS-1W and STS-1P transmitted along working and protect channels 7 and 9, respectively. Working and protect signals STS-1W and STS-1P are received by delay buffers 2, which are communicatively connected to corresponding pointer processors 4. Delay buffers 2 are used to frame-align working and protect signals STS-1W and STS-1P. Pointer processors 4 are themselves communicatively connected to one another. Pointer processors 4 payload-align working and protect signals STS-1W and STS-1P and regenerate a separate SONET frame for each of their payloads. The improved hit-less switching system of the present invention, unlike the prior art of FIG. 1, eliminates the need for regenerating a second SONET frame, and therefore only a single pointer processor function will be required to accomplish payload alignment.

In the embodiment shown in FIG. 3, hit-less pointer aligner 14 of the present invention aligns the payloads of incoming working signal STS-1W and protect signal STS-1P in the case where both signals are already frame-aligned when they arrive at hit-less pointer aligner 14. In such a case, frame location within each signal relative to the other signal is not an issue.

Frame location within the signal, however, can be limited by delay buffer 140 depth (i.e., by how much offset is built into elastic buffer 140). By adjusting delay buffer 140 depth, the amount of frame offset between working channel 7 and protect channel 9 can be correspondingly adjusted. If the degree of offset in frame location between working and protect signals STS-1W and STS-1P is not within delay buffer 140 depth, spilling of delay buffer 140 can result. A deep delay buffer 140 can buffer many frames, but if delay buffer 140 is only one frame deep, then working and protect signals STS-1W and STS-1P can only be offset by about one frame. Delay buffer 140 can be of whatever size necessary; for example, 16 bytes deep.

The size of delay buffer 140 determines how much variation can be absorbed between working pointer value 26 and protect pointer value 28. The total range of difference between pointer value 26 and protect pointer value 28, in turn, depends on the difference in delay between working channel 7 and protect channel 9. If, for example, the difference between working channel 7 and protect channel 9 is one kilometer, a calculation using the speed of light must be performed to determine the delay between working pointer value 26 and protect pointer value 28 based on that length difference. Delay buffer 140 (RAM) should be sized to ensure that, based on the path difference, working pointer value 26 and protect pointer value 28 are within one delay buffer 140 depth of each other. The minimum delay buffer 140 size should be approximately equal to the amount of delay to be compensated plus some fixed overhead for frequency justification, overhead gaps in the payload, and a guard band. Delay buffer 140 should be sized according to the maximum anticipated offset between working and protect payloads 100 and 102.

Figure 5:
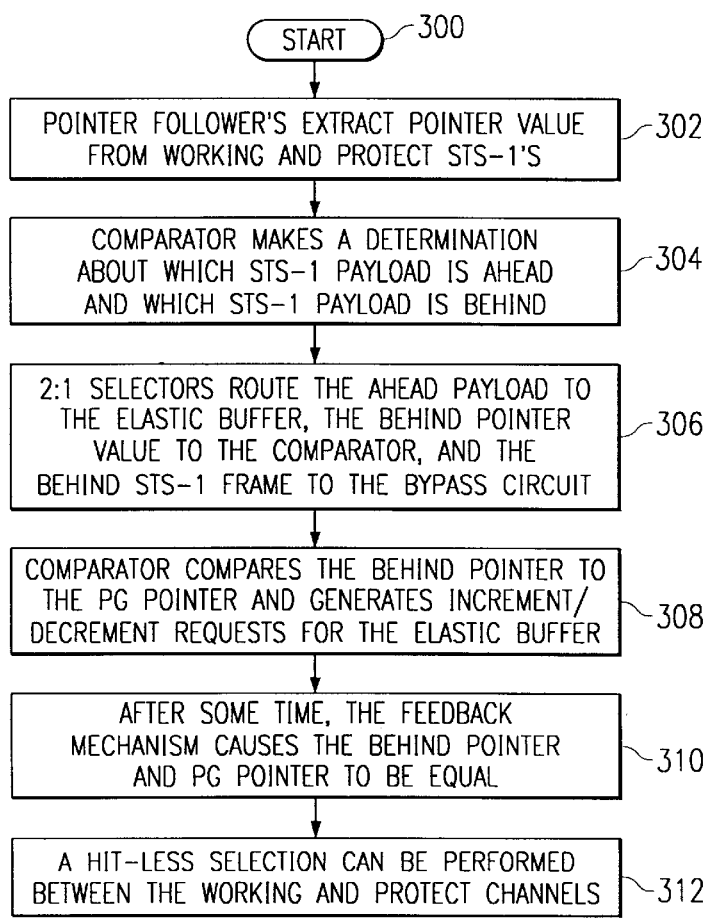
FIG. 5 shows a flow chart of one embodiment of the operational steps according to the teaching of the present invention.

FIG. 5 is a flow chart diagramming the overall operation of hit-less switching pointer aligner 14 of the present invention. Step 300 corresponds to working and protect signals STS-1W and STS-1P inputting into hit-less switching pointer aligner 14 of FIG. 3. At step 302, working and protect pointer followers 16 and 18 extract working pointer value 26 and protect pointer value 28 from working signal STS-1W and protect signal STS-1P, respectively. Working and protect pointer followers 16 and 18 also remove the SONET overhead from working and protect signals STS-1W and STS-1P and forward working payload 100 and protect payload 102 to 2:1 multiplexer 24. Working pointer value 26 and protect pointer value 28 are forwarded to comparator 20 by working and protect pointer followers 16 and 18. payload is ahead and which STS-1 payload is behind. comparator 20 does this by comparing working pointer value 26 and protect pointer value 28 and generating select bit 30, which can be low when the working signal is ahead or high when the protect signal is ahead. Comparator 20 forwards select bit 30 to 2:1 multiplexers 22, 24, 32, and, optionally, to 2:1 multiplexers 50 and 52.

Step 306 corresponds to 2:1 multiplexers 22, 24 and 32 operating together to route the ahead signal payload to delay buffer with control circuit 38, the behind signal pointer value to comparator 40, and the behind signal to the bypass portion of the circuit.

At step 308 of FIG. 5, comparator 40 compares bypass pointer value 46 and PG pointer value 48 and generates increment/decrement request signal 44 for delay buffer with control circuit 38 to operate on ahead payload 36 to align it with bypass signal 34. Comparator 40, delay buffer with control circuit 38, and pointer generator 42 operate together to form a feedback loop wherein PG pointer value 48 is acted on to alter its value to match bypass pointer value 46 over a series of increment/decrement request signals from comparator 40.

At step 310 of FIG. 5, the feedback mechanism of delay buffer with control circuit 38, pointer generator 42 and comparator 40 aligns PG pointer value 48 with bypass pointer value 46. At this point, bypass signal 34 and output signal 104 are both frame- and payload-aligned. Alternatively, bypass signal 34 and output signal 104 are both payload-aligned at this point and can be frame-aligned downstream of hit-less switching pointer aligner 14.

At step 312, a hit-less selection can now be performed between working channel 7 and protect channel 9. Output signal 104 and bypass signal 34 are now frame- and payload-aligned and can be returned to their respective channels by operation of 2:1 multiplexers 50 and 52 and forwarded to 2:1 multiplexer 58. 2:1 multiplexer 58 performs the actual hit-less selection between working and protect channels 7 and 9.

While the present invention has been described from the point of view of a working channel and a protect channel, it is understood that the channels are interchangeable. Similarly, working and protect signals STS-1W and STS-1P have been described in terms of a single frame which is operated on by hit-less switching pointer aligner 14; however, each can be comprised of a series of frames and corresponding series of payloads and payload pointers transported on a given channel. Likewise, the frames (overheads) of a given signal can have starting locations on the working channel different from those on the protect channel for a given payload.

In summary, the present invention provides an improved system and method of processing digital signals in a telecommunications system that allows for hit-less switching between a first digital signal in which a first payload, a first pointer value, and a first frame are transported on a first channel, and a second digital signal in which a second payload identical to the first payload, a second pointer value, and a second frame are transported on a second channel.

Although the present invention has been described in detail herein with reference to the illustrative embodiments, it should be understood that the description is by way of example only and is not to be construed in a limiting sense. It is to be further understood, therefore, that numerous changes in the details of the embodiments of the invention and additional embodiments of the invention will be apparent to, and may be made by, persons of ordinary skill in the art having reference to this description. It is contemplated that all such changes and additional embodiments are within the spirit and true scope of the invention as claimed below.

What is claimed is:

1. A system for processing digital signals in a telecommunications system that allows for hit-less switching between a first digital signal, having a first payload, a first pointer value, and a first frame, that is transported on a first channel, and a second digital signal, having a second payload identical to the first payload, a second pointer value, and a second frame, that is transported on a second channel comprising:

a first pointer follower to receive the first signal and forward the first pointer value and the first payload;

a second pointer follower to receive the second signal and forward the second pointer value and the second payload;

a first comparator to determine between the first signal and the second signal which signal is ahead and which is behind and to generate a select bit;

a first multiplexer to receive the select bit, the first signal and the second signal and to select and forward the behind signal;

a second multiplexer to receive the select bit, the first payload and the second payload, to determine which one of the first payload or the second payload corresponds to the ahead signal, and to select and forward the ahead signal payload;

a third multiplexer to receive the select bit, the first pointer value and the second pointer value and to select and forward a bypass pointer value equal to the behind signal pointer value;

a delay buffer with control circuit to receive, delay and forward the ahead signal payload;

a pointer generator to receive the ahead signal payload, to generate a third frame and a PG pointer value, to forward the PG pointer value, and to include the third frame and the PG pointer value with the ahead signal payload to create and forward a third signal;

a second comparator to receive the PG pointer value and the bypass pointer value and to generate, based on the amount of delay between the first payload and the second payload, an increment/decrement request signal used by the delay buffer to align the third signal with the behind signal; and a fourth multiplexer to receive the third signal and the behind signal, to hit-lessly select between the third signal and the behind signal, and to forward the selected signal.

2. The system of claim 1, wherein the third signal further comprises a third payload identical to the first and second payloads and wherein the third frame is aligned with the behind signal frame.

3. The system of claim 1, wherein the first digital signal and the second digital signal are frame-aligned with one another when received at the first pointer follower and at the second pointer follower, respectively.

4. The system of claim 1, wherein the first digital signal and the second digital signal have a format in which a signal payload and a pointer value can float within a signal frame.

5. The system of claim 1, further comprising a fifth multiplexer and a sixth multiplexer to each receive the third signal, the behind signal, and the select bit, and to each select, based on the select bit, only one of the third signal or the behind signal to return the behind signal to its original channel if necessary.

6. The system of claim 1, wherein the first, second and third multiplexers make their selection based on the value of the select bit.

7. The system of claim 1, wherein the first digital signal and the second digital signal have a SONET signal format.

8. The system of claim 1, wherein the delay buffer control circuit further comprises:

a write counter in communication with the delay buffer to write the ahead payload into the delay buffer;

a read counter in communication with the delay buffer to read the ahead payload from the delay buffer; and a phase detector to measure the offset between the write counter and the read counter, to generate a spill prevent signal, and to forward the spill prevent signal to the pointer generator to keep the delay buffer from spilling.

9. The system of claim 8, wherein the delay buffer control circuit further comprises a leaking mechanism to return the delay buffer to its nominal position following a cross-over where the ahead signal becomes a behind signal, or vice-versa.

10. The system of claim 1, wherein the first signal is further comprised of a first series of frames in which a first series of payloads and a first series of pointer values are being transported on the first channel, and wherein the second signal is further comprised of a second series of frames in which a second series of payloads identical to the first series of payloads and a second series of pointer values are being transported on the second channel.

11. The system of claim 10, wherein the second series of overheads have starting locations, for particular ones of the second series of frames, that can be different from the starting locations of identical particular frames in the first series of frames.

12. The system of claim 1, wherein the delay buffer is sized to compensate for the maximum anticipated offset between the first payload and the second payload.

13. A method for processing digital signals in a telecommunications system that allows for hit-less switching between a first digital signal having a first payload, a first pointer value, and a first frame, that is transported on a first channel, and a second digital signal having a second payload identical to the first payload, a second pointer value, and a second frame, that is transported on a second channel, comprising:

receiving the first signal at a first pointer follower and forwarding the first pointer value and the first payload;

receiving the second signal at a second pointer follower and forwarding the second pointer value and the second payload;

at a first comparator, determining between the first signal and the second signal which signal is ahead and which is behind and generating a select bit;

receiving the ahead signal, the behind signal, and the select bit at a first multiplexer, and selecting and forwarding the behind signal;

receiving the first payload, the second payload, and the select bit at a second multiplexer, and selecting and forwarding an ahead payload;

receiving the first pointer value, the second pointer value, and the select bit at a third multiplexer, and selecting and forwarding a bypass pointer value;

receiving the ahead payload at a delay buffer with control circuit and forwarding the ahead payload;

aligning the ahead signal payload with the behind signal payload, comprising:

(a) receiving at a pointer generator the ahead payload, generating a third frame and a PG pointer value, forwarding the PG pointer value, and including the third frame and the PG pointer value with the ahead payload to create a third signal;

(b) comparing at a second comparator the PG pointer value and the bypass pointer value to determine the delay between the first payload and the second payload;

(c) generating an increment/decrement request signal for the delay buffer to align the third signal with the behind signal; and (d) repeating steps (a)–(c) until the bypass pointer value is aligned with the PG pointer value;

forwarding the third signal to a fourth multiplexer; and receiving at the fourth multiplexer the third signal and the behind signal, hit-lessly selecting between the third signal and the behind signal, and forwarding the selected signal to the rest of the telecommunications system.

14. The method of claim 13, wherein the third signal further comprises a third payload identical to the first and second payloads and wherein the third frame is aligned with the behind signal frame.

15. The method of claim 13, wherein the first digital signal and the second digital signal are frame-aligned with one another when received at the first pointer follower and at the second pointer follower, respectively.

16. The method of claim 13, wherein the first digital signal and the second digital signal have a format in which a signal payload and a pointer value can float within a signal frame.

17. The method of claim 13, further comprising the step of receiving at a fifth multiplexer and at a sixth multiplexer the third signal, the behind signal, and the select bit, and selecting at each of the fifth multiplexer and the sixth multiplexer, based on the select bit, only one of the third signal or the behind signal to return the behind signal to its original channel if necessary.

18. The method of claim 13, wherein the first, second and third multiplexers make their selection based on the value of the select bit.

19. The method of claim 13, wherein the first digital signal and the second digital signal have a SONET signal format.

20. The method of claim 13, wherein the delay buffer control circuit further comprises:
 a write counter in communication with the delay buffer to write the ahead payload into the delay buffer;
 a read counter in communication with the delay buffer to read the ahead payload from the delay buffer; and
 a phase detector to measure the offset between the write counter and the read counter, to generate a spill prevent signal, and to forward the spill prevent request signal to the pointer generator to keep the delay buffer from spilling.

21. The method of claim 20, wherein the delay buffer control circuit further comprises a leaking mechanism to return the delay buffer to its nominal position following a cross-over where the ahead signal becomes a behind signal, or vice-versa.

22. The method of claim 13, wherein the first signal is further comprised of a first series of frames in which a first series of payloads and a first series of pointer values are being transported on the first channel, and wherein the second signal is further comprised of a second series of frames in which a second series of payloads identical to the first series of payloads and a second series of pointer values are being transported on the second channel.

23. The method of claim 22, wherein the second series of overheads have starting locations, for particular ones of the second series of frames, that can be different from the starting locations of identical particular frames in the first series of frames.

24. The method of claim 13, wherein the delay buffer is sized to compensate for the maximum anticipated offset between the first payload and the second payload.

* * * * *